E. WHALLEY.
TRUCK.
APPLICATION FILED MAY 12, 1916.
1,230,250.
Patented June 19, 1917.
2 SHEETS—SHEET 1.
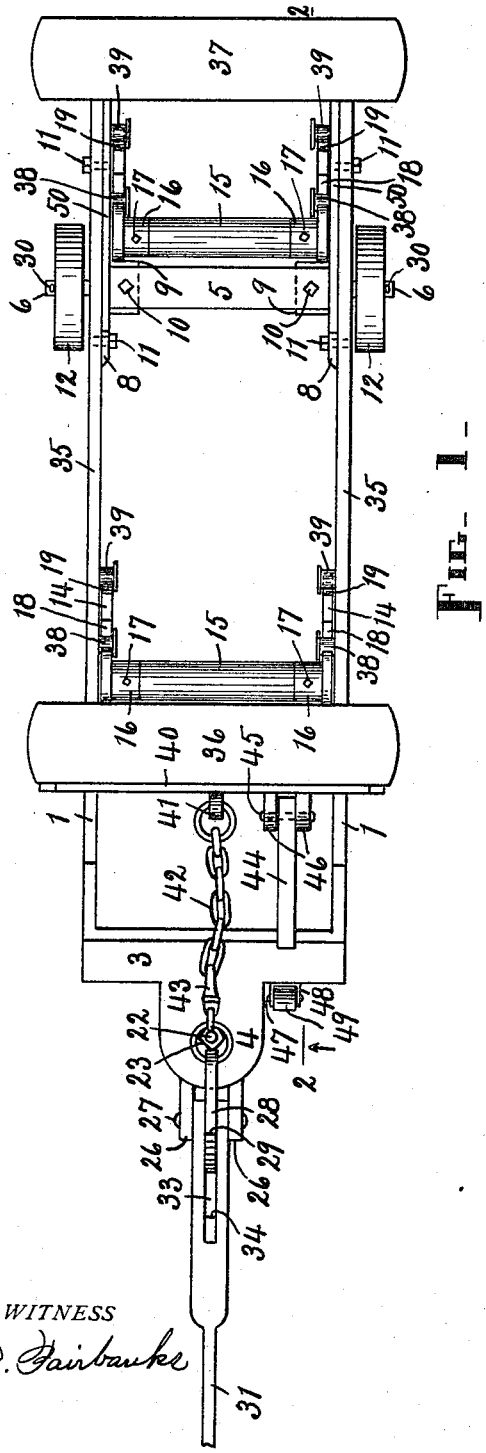
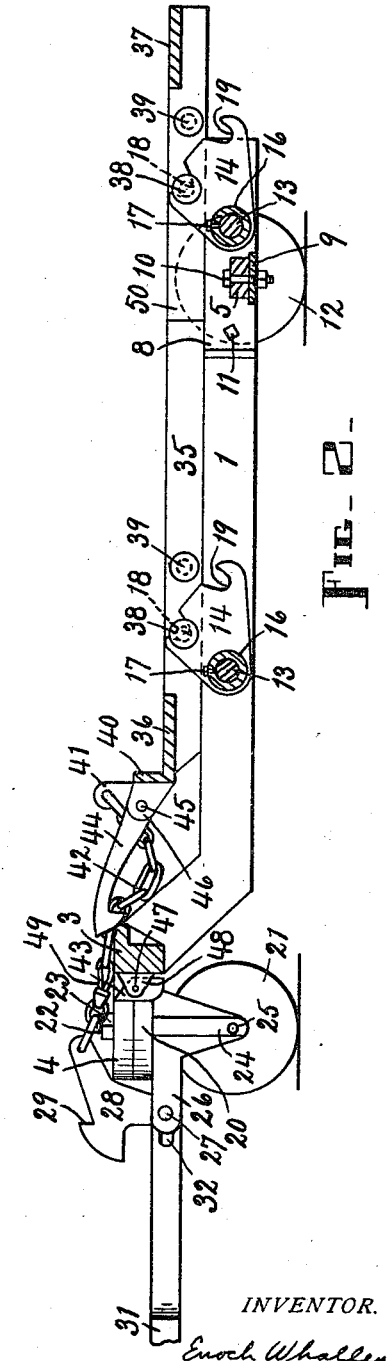
WITNESS
A. C. Fairbanks
INVENTOR.
Enoch Whalley,
BY Frank A. Cutter,
ATTORNEY.

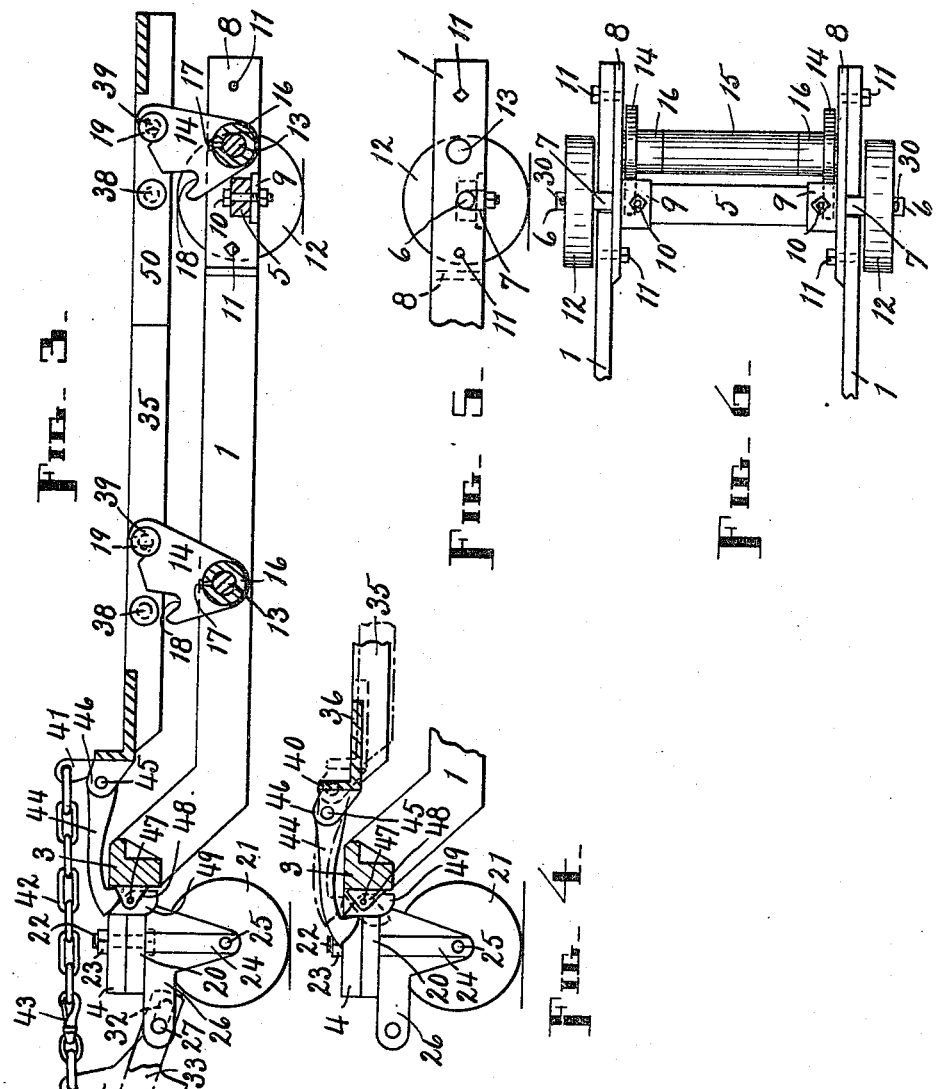

UNITED STATES PATENT OFFICE.

ENOCH WHALLEY, OF WILLIMANSETT, MASSACHUSETTS.

TRUCK.

1,230,250.  Specification of Letters Patent.  Patented June 19, 1917.

Application filed May 12, 1916. Serial No. 97,049.

*To all whom it may concern:*

Be it known that I, ENOCH WHALLEY, a citizen of the United States of America, residing at Willimansett, in the county of Hampden and State of Massachusetts, have invented a new and useful Truck, of which the following is a specification.

My invention relates to improvements in trucks of the elevating type, wherein a longitudinal movement is converted into an upward movement, for use in various places to haul goods about by hand, and consists essentially of certain peculiar truck sections and the operating mechanism therefor, the latter including means wherewith the upper section is raised from the lower section or elevated and lowered or depressed, and locking and releasing means for said upper section, together with such auxiliary and subsidiary parts and members as may be necessary or expedient in order to render the truck serviceable and practicable for the uses for which it is designed, all as hereinafter set forth.

One object of my invention is to produce a very simple, both structurally and operatively, comparatively inexpensive, strong and durable, easily operated, and highly efficient elevating truck, for use in raising goods or material from the support therefor, or with such support, from the floor, hauling said goods or material to the desired place, and there lowering and depositing the same. In this truck not only is the amount of friction reduced to the minimum, but provision is made by the peculiar raising and lowering means or mechanism for equalizing the load, hence comparatively little effort is required on the part of the operator in order to handle easily and successfully a very heavy load.

What is meant by the equalizing effect produced by the raising and lowering mechanism, and above referred to, which effect may be said to be inherent in said mechanism, is this: The load in being elevated is started slowly and with the minimum expenditure of force, and then as said load continues to rise the same force is in part absorbed as it were in the increased speed with which said load moves, so that such minimum expenditure is continuous, and, conversely, the same thing is true or the same action or kind of action takes place when the load is lowered. It is thus clear that both the raising and lowering operations, from start to finish, may be easily and quickly performed under conditions which require the putting forth of an approximately uniform amount of force on the part of the operator, so that he is not required to strain unduly either in starting a load upward or in restraining a load as it approaches the limit of its downward travel.

Another object is to provide such a truck with automatic locking and releasing means for the upper section and the load when elevated, which means is simple, effectual, and convenient, and is a source of protection for the operator when he releases the load.

The truck, while itself light in weight, is capable of handling a load of great weight; and said truck, although having an adequate range of elevation, is sufficiently low, when the upper section is depressed, to be operated in connection with a stack of goods or material that is supported very close to the floor, which is an important feature in a truck of this type.

Other objects and advantages will appear in the course of the following description.

I attain the objects and secure the advantages of my invention by the means illustrated in the accompanying drawings, in which—

Figure 1 is a top plan of a truck which embodies a practical form of my invention, the upper section being depressed and the forward portion of the handle or tongue broke off; Fig. 2, a longitudinal vertical section through said truck, taken on lines 2—2, looking in the direction of the associated arrow, in Fig. 1; Fig. 3, a similar section except that said upper truck section is in elevated position and locked in such position; Fig. 4, a sectional operative detail of the lock or latch, showing in full lines the latch hook in its forward releasing position relative to the releaser, and in broken lines said hook at a point in its backward travel and just about to ride off of said releaser onto the front cross-bar or head of the under truck section; Fig. 5, a side elevation of the rear end portion of said under section, the wheel on that side being omitted, and, Fig. 6, a bottom plan of the aforesaid rear end portion.

Similar numerals refer to similar parts throughout the several views.

This truck comprises an under section or carriage, which is a body or frame mounted on rolls or wheels; a superimposed or upper section or platform arranged to move longitudinally and upwardly relative to said carriage; compound, equalizing, oscillatory lifters arranged between said sections relatively, and constituting the movable supports for said upper section or platform and the direct means whereby said platform is raised and lowered; actuating means for drawing said platform forward on said carriage or forcing the latter backward under the former, as the case may be, to elevate said platform; a tongue which is adapted to be interlocked with and disengaged from said actuating means, and with which the truck is moved about and said platform-actuating means operated and controlled to raise and lower said platform, and automatic locking and automatic coacting releasing means for said platform when elevated.

Although I have illustrated in the drawings and will next proceed to describe in detail a truck which embodies in a practical form the essential features of the invention, it is to be understood that numerous departures in the shape, size, construction, and arrangement of some or all of the parts of the truck as thus presented may be made without departing from the spirit of said invention.

The body or frame of the carriage may be and in this case is a unitary structure of integral parts, which latter consist of two side pieces 1 turned upwardly at their front ends and connected by a cross piece 3 to form a raised head. The cross-piece or head 3 has a central, forwardly-extending, flat projection 4. The head 3 forms a stop to limit the forward movement of the platform, as presently to be described.

A cross-bar or brace 5, provided at the ends with trunnions 6—6 which are received in slots 7—7 in the bottom edges of the side pieces 1, serves as a rear axle for the carriage, such slots being located near the rear ends of said side pieces. Clamps 8—8 having inwardly-projecting lugs 9—9 are provided for the brace 5, which latter fits between the side pieces 1, with the vertical parts of said clamps interposed, while the trunnions 6, after being inserted in openings in said vertical parts of said clamps, are introduced from below into the slots 7 and extend beyond said side pieces. The lugs 9 extend under the brace 5 at the ends, and said lugs and brace are securely bolted together, as represented at 10. The clamps 8 are securely bolted to the side pieces 1, as represented at 11. Wheels 12—12 are mounted on the trunnions 6 outside of the side pieces 1, and held hereon by cotter-pins 30. Thus it will be seen that the brace 5 with its trunnions serves both as an axle and to complete the rear end portion of the carriage frame and render the same strong and stable.

Two rock-shafts 13 are journaled in the side pieces 1, one such rock-shaft being behind the combined axle and brace 5 and passing through the clamps 8, and the other being between said member 5 and the head 3. A plurality of lifters 14 is secured to the rock-shafts 13, there preferably being such a lifter at each end of each rock-shaft, just inside of the side piece 1 at that end, with a spacer sleeve 15 on such rock-shaft between the lifters or their hubs 16 which are on said rock-shaft. The sleeves 15 stiffen the structure and augment the stability of the lifters 14. Bolts 17 may be employed to secure the lifters 14 by means of their hubs 16 to the rock-shafts 13. A plurality of recesses are made in one edge of each lifter 14 to form bearings, there preferably being two such recesses or bearings 18 and 19. The bearing 19 in each lifter 14 is farther from the axis of said lifter than is the bearing 18 in said lifter. The lifters 14 are all alike, and they are so constructed and arranged that they are capable, when rocked upwardly and forwardly from a rearward position, of imparting a progressive upward movement, in addition to the normal upward movement incident to the rocking motion aforesaid, through the medium of their bearings 18 and 19, as will more clearly appear hereinafter.

The wheels 12 support the carriage at the rear end, and said carriage is supported at the front end by a swivel 20 and a wheel 21, the projection 4 resting directly on said swivel and the latter being rotatably secured thereto by a bolt 22 that passes upwardly through the top of said swivel and through said projection, and a nut 23 on the upper end of said bolt. The bolt 22 is the pivot pin for the swivel 20. The wheel 21 is mounted between lugs 24, which form parts of the swivel 20, on an axle 25 that is journaled in said lugs. Projecting forwardly from the swivel 20 at the top are two more lugs 26 having a pin 27 at their front ends.

An angular latch 28 is mounted at one end to swing on the pin 27, and has a tooth 29. A tongue 31 is also mounted at its inner end to swing on the pin 27, said tongue having a slot 32 therein to receive said pin and permit said tongue to move longitudinally thereon. The latch 28 is received and operates in a slot 33 provided for it in the tongue 31, and the latter has a tooth 34 which may be engaged with and disengaged from the latch tooth 29. In Figs. 1 and 2 the tongue 31 is out of engagement with the latch 28 and free to be used in hauling the truck about, while in Fig. 3 said tongue and latch are in operative engagement. The construction and operation of these parts and members are practically identical with the construction and operation of corresponding parts and members in my application for United States Letters Patent, Serial No. 54,665.

The platform, like the carriage frame, may be and here is a unitary structure of integral parts, and such parts consist of two side pieces 35 and front and rear end connecting or cross pieces 36 and 37, respectively, the former having a flange 40 at its front edge to form a forward stop for the load. The cross pieces 36 and 37 are let into the upper edges of the side pieces 35 and extend beyond the latter to afford ample supporting area for the load. The side pieces 35 are directly over the side pieces 1, and the former rest on the latter when the platform is in its normal or low position.

The side pieces 35 are provided with as many studs as there are peripheral recesses in the lifters 14, hence there are here present eight studs, or a stud 38 for each bearing 18 and a stud 39 for each bearing 19. Each set or pair of studs 38 and 39 projects from the inside face of the supporting side piece 35 into the paths respectively of the bearings 18 and 19 of the adjacent lifter 14. When the platform is down on the carriage frame, the lifters 14 are disposed with their bearings 18 in engagement with the studs 38, and their bearings 19 below and out of engagement with the studs 39.

Assuming that the platform be drawn forward on the carriage frame, it is very evident that said platform must then be elevated, since the studs 38 in the bearings 18 rock the lifters 14, on the rock-shafts 13, upwardly and forwardly and said platform is raised by said lifters from said frame. The lifters 14 continue to carry up the platform with the studs 38 in the bearings 18 until the bearings 19 pass into engagement with the studs 39, when said platform is elevated still more by said lifters. The bearings 19, acting through the studs 39, raise the platform higher and more quickly than would be possible with the bearings 18. The bearings 19 raise the platform so that the studs 38 are quite widely separated from the bearings 18, as clearly shown in Fig. 3. Thus the slow start from the horizontal position initially required in elevating the platform, is changed by the development of accelerated motion and the closer and still closer approach to the vertical direction, with the result that the power required is approximately equalized. Conversely or in inverse order the facts are the same, when the platform is moved or permitted to be moved backward and lowered. The studs 39 are first carried down part way by the bearings 19, and then the studs 38 are received in the bearings 18, and the descent of the platform onto the carriage frame finally is completed while said last-mentioned studs and bearings are in engagement. As the speed decreases less power is required to control the platform with its load, hence by the time the platform nearly approaches the carriage frame, it is easy to control said platform and load and prevent undue shock.

The progressive elevating and depressing means described above enables me to obtain a more nearly vertical motion and incidentally more speed, at the time the least power is required, than would be possible with ordinary links or link mechanism. The progressive movement and nearer approach to the vertical are due, of course, to the fact that the radius of the arc of travel of the bearings 19 in each case is greater than that of the bearings 18 in each case.

The bearings 18 and 19 and the studs 38 and 39 should be so positioned relatively as to permit the bearings 19 to engage the studs 39 and lift the studs 38 out of engagement with the bearings 18 before said bearings 18 arrive at their dead centers, otherwise the parts might bind or become locked together.

The carriage is equipped with the lifters and the platform with the studs, instead of inverting this order, because by the first arrangement the truck is rendered far more stable, operatively and every other way, than it would be in the other case.

A lug 41 projects from the center of the cross piece 36, and a flexible connection, as a chain 42, extends between said lug and the free end of the latch 28. The chain 42 should be long enough to permit of the necessary lost motion or play. I prefer to insert a snap-hook 43 in the chain 42 as a part thereof, in order that the latter may be shortened when it is necessary to operate the tongue, either to raise or lower the load, in a restricted space. It is the act of rocking the latch 28 on the pin 27 forward and downward, from the position which it occupies in Figs. 1 and 2, that causes the platform to be drawn forward, or the carriage to be forced backward, and said platform consequently to be elevated, said latch operating through the chain 42 and the lug 41.

A gravity latch hook 44 has its rear end pivoted at 45 to two lugs 46 on the front of the cross piece 36 at one side of the transverse center of said piece. The hook 44 is so arranged that its free end rides over the top of and drops into engagement with the front edge of the head 3, when the platform is drawn forward into elevated position, as shown in Fig. 3, for the purpose of holding said platform in such position. When the platform is in its low position, the head of the hook 44 rests against the rear edge of the head 3. Pivotally mounted at 47 in a bracket 48 on the front of the head 3 is a tumbler-block or what I prefer to term a releaser 49. The top of the releaser 49 inclines from the front edge rearwardly and downwardly, and the front end of the hook 44 is similarly or correspondingly inclined, whereby said hook is enabled to drop into engagement with the head 3, as before explained, and also to ride forward over said releaser, since the latter is in line with or in the path of said hook. The latter is so hung that it normally assumes a vertical position by gravity.

In drawing the platform forward to lock the same, care should be exercised to stop as soon as the latch hook 44 drops down ready to engage the front edge of the head 3, and then, when said platform is released and settles back, said hook becomes locked to said head and holds the platform in elevated position. To unlock and release the platform, draw the same forward from locked position until the lugs 46 strike the rear edge of the head 3, and then permit said platform to move rearwardly and downwardly until it comes to rest on the carriage frame. The act of unlocking is effected in this manner: The hook 44 when moved forward rides over the top front edge of the releaser 49 and drops into engagement therewith, as shown in full lines in Fig. 4, and then, as said hook is carried back by the platform, the hook tilts said releaser so as to force the beveled edge thereof into contiguity with the front of the head 3, as represented in broken lines in said view, and the hook rides up the now inclined front side of the releaser and onto said head, finally coming to rest against the back edge of the head. The top front edge of the releaser 49 is level with the top of the head 3, when said releaser is tilted in the manner just explained. As soon as the hook clears the releaser the latter again assumes its normal upright position.

The lifters 14 extend upwardly inside of the side pieces 35, at all times, and so steady the platform and prevent it from moving laterally on or relative to the carriage.

The piles or stacks of goods or material to be transported with my truck are supported from the floor at a sufficient height to enable said truck to be backed under any such stack while the platform is depressed, and ordinarily portable benches are provided to support such goods or material, such benches in each case being raised, carried, and set down without removing the goods therefrom.

Briefly the operation of the truck as a whole is described as follows, starting with the parts disposed as in Figs. 1 and 2: The truck is hauled by the tongue 31 to the vicinity of the load to be moved and backed beneath the same. Then the tongue is swung up and caused to interlock with the latch 28, and forced forward and downward to raise the load, which includes the bench when present, from the floor, on or with the platform, through the medium of said latch, the chain 42, and the lug 41, the lifters 14, on the rock-shafts 13 rendering the operation easy of accomplishment. As soon as the platform is raised nearly to the full extent it is locked by the latch hook 44 in the manner previously explained—see Fig. 2. Next the truck with its load is hauled by means of the tongue to the desired locality, being steered without difficulty and unhampered by the latch 28, because said tongue moves out of locking engagement with said latch as soon as the tongue is pulled forward for hauling purposes. And, finally, the load is deposited by reëngaging the tongue tooth 34 with the latch tooth 29, forcing down said tongue to actuate the platform a little farther forward, enough so in fact for the hook 44 to advance its tooth beyond the releaser 49, and then slowly swinging said tongue upwardly and rearwardly to permit the platform to descend, under the control of the tongue, until the bench rests on the floor, or the load in the absence of the bench rests upon other supporting means, said hook having meanwhile ridden up said releaser and over the head 3. The truck is now drawn from beneath the load and out of the way.

When the mechanism is operated to elevate the load and the platform comes into contact with the under surface of the load, there is usually so much frictional resistance that said platform is held stationary while the carriage moves backward on the wheels 12 and 21, but the desired result of elevating the platform and carrying the load up with it is attained just the same as though the carriage were held stationary and the platform moved forwardly as well as upwardly.

Obviously, if links long enough to raise the platform to the required height from a sufficiently low plane were substituted for the progressive lifting means employed in this truck, it would be practically impossible to start a load of any considerable weight. By providing the aforesaid progressive means, which here takes the form of the lifters 14, with their bearings 18 and 19 traveling in arcs of different length radiuses, and the studs 38 and 39, the raising and lowering operations are easily and quickly performed under conditions that require the putting forth of an approximately uniform amount of force on the part of the operator, from start to finish, or, in other words, the load in being elevated is started slowly and with the minimum expenditure of force, and then as said load continues to rise the same force is partially absorbed as it were in the increased speed with which said load moves, so that such minimum expenditure is substantially continuous, and, inversely, the same thing is true or the same action or kind of action takes place when the load is lowered. Thus full and complete control is given into the hands of the operator.

The latch 28 when locked to the tongue 31 also serves in the capacity of an equalizer.

The releaser 49, when tilted by the hook 44 into releasing position, becomes a track upon which said hook travels to the top of the head 3.

A portion of one side of the tongue 31, in Fig. 3, is cut away in order to show clearly the engagement between the teeth 29 and 34.

When the platform is in elevated position it is supported by the studs 39 in the lifter bearings 19. In this connection it should be noted that the parts and members are so proportioned as to prevent the platform from being drawn far enough forward to rock the lifters 14, in the same direction, to the extent of carrying the bearings 39 to the vertical axial planes of the rock-shafts 13. The bearings 19 must always be back of the aforesaid planes, otherwise the platform when released would not descend automatically.

The side pieces 35 are thickened or reinforced at their rear terminals, as shown at 50—50, to compensate for the thickness of the vertical parts of the clamps 8.

What I claim as my invention, and desire to secure by Letters Patent, is—

1. The combination, in a truck, of relatively movable upper and under sections provided with fixed and movable engaging members, elevating means for said upper section, means to actuate either or both of said sections to raise said upper section through the medium of said elevating means, said engaging members being so arranged that they are engaged when said upper section is brought into elevated position, and an independently-movable track-forming member carried adjacent to said fixed member, for said movable member normally out of track-forming position, but arranged to be actuated by said movable member into such position, when said upper section is actuated to advance said movable member and carry it away from said fixed member, and then actuated to draw back said movable member.

2. The combination, in a truck, of a carriage having a fixed part, a platform adapted to be actuated forward, means to elevate said platform as it is actuated forward, a member on said platform for engaging said fixed part to hold said platform in its forward elevated position, and a movable track-forming member carried adjacent to said fixed part in position to be engaged by said first-named member when the latter is moved beyond said fixed part by the actuation of said platform beyond its normal forward elevated position, the subsequent return of said platform toward its rearward lowered position causing the first-named member to move said track-forming member into position to guide the first named member away from said fixed part and permit the platform to move rearwardly and downwardly.

3. The combination, in a truck, with a carriage having a fixed part, and a releaser pivotally mounted adjacent to said part, of a platform provided with a hook adapted to engage said fixed part, when said platform is advanced, elevating and depressing means for said platform, and means to actuate said platform forward, on said first-mentioned means, said releaser being in the path of said hook, when the latter is advanced beyond said fixed part, and adapted to swing against said part and provide a track for said hook, when said platform is permitted to move rearwardly, whereby said hook is disengaged from said fixed part.

4. The combination, in a truck, with a carriage having a head, a releaser pivotally attached to said head, rock-shafts journaled in said carriage, and lifters secured on said rock-shafts, each of said lifters having a plurality of bearings, of a platform mounted on said carriage, and provided with studs which are in the paths of said bearings, and further provided with a hook adapted to engage said head, when said platform is advanced to locking position, and to tilt said releaser into operative position, when said platform is advanced to releasing position and permitted to move rearwardly, and means to actuate said platform forward.

ENOCH WHALLEY.

Witnesses:
F. A. CUTTER,
A. C. FAIRBANKS.